United States Patent [19]

Mrozinski

[11] Patent Number: 4,726,989

[45] Date of Patent: Feb. 23, 1988

[54] MICROPOROUS MATERIALS INCORPORATING A NUCLEATING AGENT AND METHODS FOR MAKING SAME

[75] Inventor: James S. Mrozinski, Oakdale, Minn.

[73] Assignee: Minnesota Mining and Manufacturing, St. Paul, Minn.

[21] Appl. No.: 940,731

[22] Filed: Dec. 11, 1986

[51] Int. Cl.$^4$ .................. B29D 27/04; B32B 3/10
[52] U.S. Cl. .................. 428/315.5; 210/500.36; 264/288.8; 264/289.3; 264/290.2; 428/317.9; 428/319.1
[58] Field of Search ............... 210/500.36; 264/288.8, 264/289.3, 290.2; 428/315.5, 317.9, 318.9, 319.1; 521/82

[56] References Cited

U.S. PATENT DOCUMENTS

| | | | |
|---|---|---|---|
| 3,201,364 | 8/1965 | Salyer | 524/474 |
| 3,207,735 | 9/1965 | Wijga | 524/287 |
| 3,207,737 | 9/1965 | Wales | 524/396 |
| 3,207,738 | 9/1965 | Wijga | 524/285 |
| 3,214,501 | 10/1965 | Strauss | 264/49 |
| 3,299,029 | 1/1967 | Binsbergen et al. | 528/485 |
| 3,308,073 | 3/1967 | Kepple | 521/64 |
| 3,539,374 | 11/1970 | Isaacson | 428/315.7 |
| 3,640,829 | 2/1972 | Elton | 428/315.7 |
| 3,679,540 | 7/1972 | Zimmerman et al. | 428/265 |
| 3,793,060 | 2/1974 | Weininger et al. | 428/315.7 |
| 3,870,593 | 3/1975 | Elton et al. | 428/315.5 |
| 3,953,566 | 4/1976 | Gore | 264/288.8 |
| 3,962,153 | 6/1976 | Gore | 521/79 |
| 4,096,227 | 6/1978 | Gore | 264/288.8 |
| 4,100,238 | 7/1978 | Shinomura | 264/49 |
| 4,110,392 | 8/1978 | Yamazaki | 264/127 |
| 4,187,390 | 2/1980 | Gore | 174/102 R |
| 4,194,041 | 3/1980 | Gore et al. | 428/315.5 |
| 4,197,148 | 4/1980 | Shinomura | 156/79 |
| 4,206,980 | 6/1980 | Krueger et al. | 350/359 |
| 4,247,498 | 1/1981 | Castro | 264/41 |
| 4,519,909 | 5/1985 | Castro | 210/500.2 |
| 4,539,256 | 9/1985 | Shipman | 428/315.5 |
| 4,588,633 | 5/1986 | Kono et al. | 428/220 |

FOREIGN PATENT DOCUMENTS

| | | |
|---|---|---|
| A48224/85 | 4/1986 | Australia. |
| 0160551 | 11/1985 | European Pat. Off.. |
| 0180987 | 5/1986 | European Pat. Off.. |
| 0183103 | 6/1986 | European Pat. Off.. |
| 58-29839 | 2/1983 | Japan. |
| 60-229731 | 11/1985 | Japan .................. 264/288.8 |
| 2026381A | 7/1979 | United Kingdom. |

OTHER PUBLICATIONS

C. Charles Carroll, "A Nucleating Agent for Crystalline Olefinic Polymers," Modern Plastics, Sep. 1984, pp. 108–112.

Primary Examiner—William J. van Balen
Attorney, Agent, or Firm—Donald M. Sell; James A. Smith; Dale E. Hulse

[57] ABSTRACT

The present invention relates to microporous materials incorporating a nucleating agent and methods for making the same. The method comprises the steps of melt blending a crystallizable thermoplastic polymer with a nucleating agent which is capable of inducing subsequent crystallization of the thermoplastic polymer and with a compound which is miscible with the thermoplastic polymer at the melting temperature of the polymer but phase separates on cooling at or below the crystallization temperature of the polymer, forming a shaped article of the melt blend, cooling the shaped article to a temperature at which the nucleating agent induces the thermoplastic polymer to crystallize so as to cause phase separation to occur between the thermoplastic polymer and the compound, thereby providing an article comprising an aggregate of a first phase comprising particles of crystallized thermoplastic polymer in a second phase of the compound, and stretching the article in at least one direction to provide a network of interconnected micropores throughout. Preferably, the compound is removed either before or after stretching. The use of a nucleating agent in accordance with the present invention provides for the manufacture of a wide variety of microporous materials heretofore not possible having a wide range of porosity and other physical characteristics.

35 Claims, 15 Drawing Figures

MICROPOROUS MATERIALS INCORPORATING A NUCLEATING AGENT AND METHODS FOR MAKING SAME

BACKGROUND

1. The Field of the Invention

The present invention relates to microporous materials, and in particular, to microporous materials formed of a polymer incorporating a nucleating agent and methods for making the same.

2. The Prior Art

Microporous films or membranes have a structure that enables fluids to flow through them. The effective pore size is at least several times the mean free path of the flowing molecules, namely, from several micrometers down to about 100 Angstroms. Such sheets are generally opaque, even when made from an originally transparent material, because the surfaces and internal structure scatter visible light.

Microporous membranes or films have been utilized in a wide variety of applications, such as for the filtration of solids, for the ultrafiltration of colloidal matter, as diffusion barriers or separators in electrochemical cells, in the preparation of synthetic leather, and in the preparation of cloth laminates. The latter utilities require, of course, permeability to water vapor but not liquid water when preparing such materials as synthetic shoes, raincoats, outer wear, camping equipment such as tents, and the like. Moreover, microporous membranes or films are often utilized for filter cleaning antibiotics, beer, oils, bacteriological broths, as well as for the analysis of air, microbiological samples, intravenous fluids, vaccines, and the like. Microporous membranes or films are also utilized in the preparation of surgical dressings, bandages, and in other fluid transmissive medical applications.

Microporous membranes or films may be laminated to other articles to make laminates having particular utility. Such laminations may include a microporous layer and an outer shell layer to provide a particularly useful garment material. Further, the microporous films or membranes may be utilized as a tape backing to provide such products as vapor transmissive wound dressings or hair set tapes.

One patent relating to the preparation of microporous materials is assignee's U.S. Pat. No. 4,539,256 (Shipman), issued Sept. 3, 1985, which discloses a method of making a microporous material comprising the steps of melt blending crystallizable thermoplastic polymer with a compound which is miscible with the thermoplastic polymer at the melting temperature of the polymer but phase separates on cooling at or below the crystallization temperature of the polymer, forming a shaped article of the melt blend, cooling the shaped article to a temperature at which the polymer crystallizes to cause phase separation to occur between the thermoplastic polymer and the compound to provide an article comprising a first phase comprising particles of crystallized thermoplastic polymer in a second phase of the compound, and orienting the article in at least one direction to provide a network of interconnected micropores throughout. Brief mention is made of nucleating agents.

The use of nucleating agents to improve the optical properties of crystalline olefinic polymers is discussed in the article: C. Charles Carroll, "A Nucleating Agent for Crystalline Olefinic Polymers," Modern Plastics, September 1984, pages 108–112. U.S. Pat. Nos. 3,207,735; 3,207,737; 3,207,738; and 3,299,029 also disclose the usage of nucleating agents in polymer crystallization techniques.

BRIEF SUMMARY OF THE INVENTION

Microporous materials are made in accordance with the present invention by the following steps:

(a) melt blending to form a mixture comprising about 15 to about 80 parts by weight of crystallizable thermoplastic polymer, sufficient nucleating agent to initiate subsequent crystallization of the thermoplastic polymer at a significantly greater number of crystallization sites as compared to crystallization without the nucleating agent, and about 85 to about 20 parts by weight of a compound with which the thermoplastic polymer is miscible and in which the thermoplastic polymer will dissolve at the melting temperature of the thermoplastic polymer but which will phase separate on cooling to a temperature at or below the crystallization temperature of the thermoplastic polymer;

(b) forming a shaped article of the melt blended mixture;

(c) cooling the shaped article to a temperature at which the nucleating agent initiates the crystallization sites within the thermoplastic polymer so as to cause phase separation to occur between the compound and the polymer, thereby providing an article comprising an aggregate of a first phase comprising particles of crystallized thermoplastic polymer in a second phase comprising the compound with adjacent thermoplastic polymer particles being distinct but having a plurality of zones of continuity, wherein the particles have a size which is significantly reduced as compared to the size the particles would have if no nucleating agent were present; and (d) stretching the shaped article in at least one direction to separate adjacent particles of thermoplastic polymer from one another to provide a network of interconnected micropores therebetween and to permanently attenuate the thermoplastic polymer in the zones of continuity to form fibrils.

Preferably, the compound is removed from the article, e.g., by solvent extraction or by volatilization of the compound. However, the nucleating agent becomes incorporated within the interior of the particles of thermoplastic polymer, and is therefore typically not removed.

The formed article, before additive removal and stretching, is solid and generally transparent, and comprises an aggregate of a first phase of particles of crystallized thermoplastic polymer in a second phase of the additive compound, with nucleating agent in the interior of the particles of thermoplastic polymer. The particles may be described as spherulites and aggregates of spherulites of the polymer, with additive compound occupying the space between particles. Adjacent particles of polymer are distinct, but they have a plurality of zones of continuity. That is, the polymer particles are generally surrounded or coated by the compound, but not completely. There are areas of contact between adjacent polymer particles where there is a continuum of polymer from one particle to the next adjacent particle in such zones of continuity.

On stretching, the polymer particles are pulled apart, permanently attenuating the polymer in zones of continuity, thereby forming the fibrils, forming minute voids between coated particles, and creating a network of interconnected micropores. Such permanent attenuation also renders the article permanently translucent. Also on stretching, if the compound is not removed, the compound remains coated on or surrounds, at least partially, the surfaces of the resultant thermoplastic polymer particles. The degree of coating, of course, depends upon the affinity of the compound for the surface of the polymer particle, whether the compound is a liquid or solid, whether stretching dislodges or disrupts the coating, and upon other relevant factors. The particles are usually at least partially coated after stretching. Substantially all of the particles appear to be connected by fibrils. The size of the micropores is easily controlled by varying the degree of stretching, the amount and type of nucleating agent employed, the amount of additive compound employed, melt-quench conditions, compound removal, and heat stabilization procedures. For the most part, the fibrils do not appear to be broken by stretching, but they are permanently stretched beyond their elastic limit so that they do not elastically recover to their original position when the stretching force is released. As used herein, "stretching" means such stretching beyond the elastic limit so as to introduce permanent set or elongation of the article. By contrast, assignee's U.S. Pat. No. 4,206,980 (Krueger), issued June 10, 1980, discloses films without nucleating agents having fibrils not stretched beyond the elastic limit in order to preserve the reversibly transparent-translucent feature of the films described in that patent.

The articles and materials of the present invention have a microporous structure characterized by a multiplicity of spaced (i.e., separated from one another), randomly dispersed, non-uniform shaped, equiaxed particles of thermoplastic polymer connected by fibrils, with nucleating agent in the interior of the particles. (Equiaxed means having approximately equal dimensions in all directions.) If the additive compound is not removed, the particles of thermoplastic polymer are also coated with the compound.

The preferred article according to the present invention is in the form of a sheet or film, although other article shapes are contemplated and may be formed. For example, the article may be in the form of a tube or filament. Other shapes which can be made according to the disclosed process are also intended to be within the scope of the invention.

Because a nucleating agent is used to form the microporous materials of the present invention, much greater amounts of additive compound can be used relative to the thermoplastic polymer forming the microporous materials. Moreover, the resultant microporous materials can be made to have a relatively higher degree of porosity than if no nucleating agent were used, because much greater stretching of the materials can be achieved. As a result, the microporous materials of the present invention have a broader base of useful porous and physical properties.

Further, because a nucleating agent is employed in the present invention, the resultant particles of thermoplastic polymer are greatly reduced in size over the size the particles would have if no nucleating agent were employed. Because reduction in particle size results in more particles, the number of fibrils per unit volume is also increased. Moreover, the length of the fibrils is greatly increased when a nucleating agent is employed because of the surprisingly greater stretchability which can be achieved. Additionally, the tensile strength of the resultant microporous materials is greatly increased. Hence, by employing a nucleating agent, surprising results are achieved, and much more useful microporous materials can be prepared.

Certain terms are used in the specification and claims herein, that are well known for the most part, but may require some explanation.

Thus, it will be understood that, when referring to the thermoplastic polymer as being "crystallized," this means that it is at least partially crystalline. Crystalline structure in melt processed thermoplastic polymers is well understood by those skilled in the art. It will be further understood that the term "thermoplastic polymer" refers only to conventional polymers which are melt processable under ordinary melt processing conditions. The term "thermoplastic polymer" is not intended to include polymers characterized by including solely perfluoro monomeric units, e.g., perfluoroethylene units, such as polytetrafluoroethylene (PTFE) which, under extreme conditions, may be thermoplastic and rendered melt processable.

The term "melting temperature" refers to the temperature at which the polymer in a blend of polymer, blending compound, and nucleating agent will melt. The term "crystallization temperature" refers to the temperature at which the polymer in the blend will crystallize. The term "equilibrium melting point" refers to the commonly accepted melting temperature of the pure polymer, as may be available in published references.

The melting and crystallization temperature of a thermoplastic polymer, in the presence of a blending compound and a nucleating agent, is influenced by both an equilibrium and a dynamic effect. At equilibrium between liquid and crystalline polymer, thermodynamics require that the chemical potentials of the polymer repeating unit in the two phases be equal. The temperature at which this condition is satisfied is referred to as the melting temperature, which will depend upon the composition of the liquid phase. The presence of impurities (such as the blending compound) in the liquid phase will lower the chemical potential of the polymer repeating units in that phase. Therefore, a lower melting temperature is required to reestablish the condition of equilibrium, resulting in what is known as a melting temperature depression. Moreover, the nucleating agent serves to initiate a greater number of crystallization sites, thereby speeding up the crystallization process.

The crystallization temperature and melting temperature are equivalent at equilibrium. However, at nonequilibrium conditions, which are normally the case, the crystallization temperature and melting temperature are dependent on the cooling rate and heating rate, respectively. Consequently, the terms "melting temperature" and "crystallization temperature," when used herein, are intended to include the equilibrium effect of the blending compound and nucleating agent as well as the dynamic effect of the rate of heating or cooling.

DETAILED DESCRIPTION OF THE PREFERRED EMBODIMENTS

Figure 1:
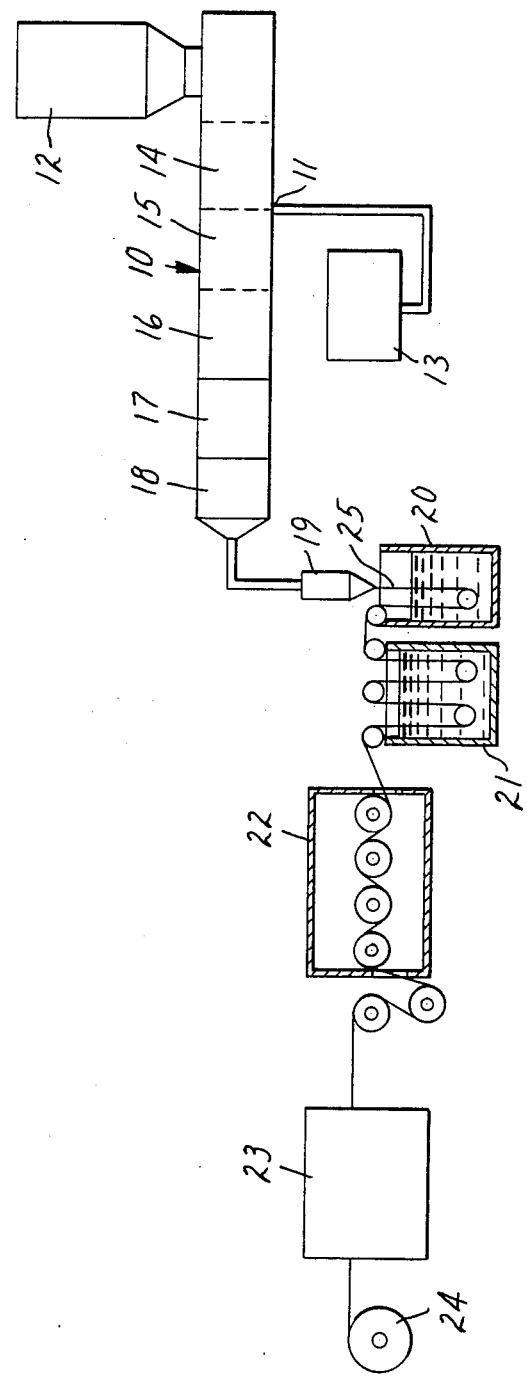
FIG. 1 is a schematic illustration of an apparatus that may be used to practice the methods of the present invention in order to produce microporous materials in accordance with the present invention.

Crystallizable polymers suitable for use in the preparation of microporous materials within the scope of the present invention are well-known and readily commercially available. The useful polymers are melt processable under conventional processing conditions. That is, on heating, they will easily soften and/or melt to permit processing in conventional equipment, such as an extruder, to form a sheet. Crystallizable polymers, upon cooling their melt under controlled conditions, spontaneously form geometrically regular and ordered chemical structures. Preferred crystallizable polymers for use in the present invention have a high degree of crystallinity and also possess a tensile strength of at least about 70 kg/cm$^2$ or 1000 psi.

Examples of suitable crystallizable polymers include addition polymers such as polyolefins and condensation polymers such as polyamides. Useful polyolefins preferably include the polymers of ethylene and propylene, but also may include 1-octene, styrene, and the like, the copolymers of two or more such olefins that may be polymerized to contain crystalline and amorphous segments, and mixtures of stereo-specific modification of such polymers, e.g., mixtures of isotactic polypropylene and atactic polypropylene, or of isotactic polystyrene and atactic polystyrene. Useful polyamides include polyhexamethyleneadipamide, polyhexamethylenesebacamide, and polycaprolactam. Another useful polymer is polyvinylidene fluoride.

Compounds suitable for blending with the crystallizable polymer to make the microporous materials of the present invention are, at room temperature, liquids or solids in which the crystallizable polymer will dissolve to form a solution at the melting temperature of the crystallizable polymer, but will phase separate on cooling at or below the crystallization temperature of the crystallizable polymer. Preferably, these compounds have a boiling point at atmospheric pressure at least as high as the melting temperature of the crystallizable polymer. However, compounds having lower boiling points may be used in those instances where superatmospheric pressure may be employed to elevate the boiling point of the compound to a temperature at least as high as the melting temperature of the crystallizable polymer. Generally, suitable compounds have a solubility parameter and a hydrogen bonding parameter within a few units of the values of these same parameters for the crystallizable polymer.

Some examples of blends of crystallizable polymers and blending compounds which are useful in preparing microporous materials in accordance with the present invention include: polypropylene with mineral oil, dioctylphthalate, or mineral spirits; polyethylene with mineral oil or mineral spirits; polypropylene-polyethylene copolymer with mineral oil; nylon (e.g., nylon 6–11) with triethylene glycol; and polyvinylidene fluoride with dibutyl phthalate.

A particular combination of polymer and blending compound may include more than one polymer, i.e., a mixture of two or more polymers and/or more than one blending compound. Mineral oil and mineral spirits are examples of mixtures of blending compounds, since they are typically blends of hydrocarbon liquids. Similarly, blends of liquids and solids may also serve as the blending compound. Optionally, if desired, the polymer may include blended therein certain conventional additive materials, which materials should be limited in quantity so as not to interfere with the formation of the microporous material and so as not to result in unwanted exuding of the additive. Such additives may include, for example, antistatic materials, dyes, plasticizers, UV absorbers, and the like. When used, the amount of such conventional additive is typically less than about 10% of the weight of the polymer component, and preferably less than about 2% by weight.

The nucleating agent employed in the present invention serves the important functions of inducing crystallization of the polymer from the liquid state and enhancing the initiation of polymer crystallization sites so as to speed up the crystallization of the polymer. Thus, the nucleating agent employed must be a solid at the crystallization temperature of the polymer. Because the nucleating agent serves to increase the rate of crystallization of the polymer, the size of the resultant polymer particles or spherulites is reduced. Many unexpected and surprising benefits are achieved when using such a nucleating agent.

First, it has been found that the usage of a nucleating agent allows for much greater quantities of additive compound to be used, relative to the amount of thermoplastic polymer used, in forming the microporous materials of the present invention. In this regard, it has been found that, by using a nucleating agent in accordance with the present invention, the compound to polymer ratio of the microporous materials can be increased by up to about 250% of the maximum compound to polymer ratio that the microporous materials would have if no nucleating agent were present. As a result, different microporous materials than heretofore possible may be created by using the present invention.

A second advantage of the microporous materials prepared by using a nucleating agent is that these oriented microporous materials have a surprisingly higher degree of porosity than would be achieved if no nucleating agent were employed, and the microporous materials prepared may be stretched to a surprisingly greater degree. In fact, the present invention makes it possible to prepare microporous materials which may be stretched to an area increase of over 1100%, which microporous materials could not even be prepared and stretched 10% without crumbling to the touch by techniques heretofore employed, such as those disclosed in U.S. Pat. No. 4,539,256. Thus, the present invention provides methods for preparing a broader range of useful microporous materials having a wider variety of porous and physical properties.

As mentioned, when employing a nucleating agent in accordance with the present invention, the particles of thermoplastic polymer in the resultant microporous material are greatly reduced in size. For example, it has presently been found that the size of the particles can be reduced by at least up to about 85% of the size said particles would have if no nucleating agent were present. For polypropylene, particle sizes of about 0.1 to about 5.0 microns have been achieved, with average particle sizes of 2 microns or less being typical. It will be understood, however, that the precise particle size obtained will be dependent upon the precise additive, component concentrations, and processing conditions employed. Moreover, the number of fibrils per unit volume and the length of the fibrils are dramatically increased by using a nucleating agent. In this regard, it has been found that the number of fibrils per unit volume may be increased by up to about 815% and that the length of the fibrils may be increased by up to about 700% than if no nucleating agent were used.

One of the most surprising and beneficial results of the microporous materials made using a nucleating agent in accordance with the present invention is the excellent stretchability and tensile strength improvements of the microporous materials. In this regard, it has presently been found that the stretchability of the resultant microporous material may be increased so that the total area of the material can be increased by up to about 1125%, and that the tensile strength may be increased by up to about 295% of the tensile strength that would be characteristic of the same microporous material made without a nucleating agent. Clearly, the dramatic increase in the stretchability of the microporous materials made possible by using a nucleating agent provides the way for the preparation of a multiplicity of microporous materials heretofore unknown.

Some examples of nucleating agents which have been found useful for purposes of the present invention include aryl alkanoic acid compounds, benzoic acid compounds, and certain dicarboxylic acid compounds. In particular, the following specific nucleating agents have been found useful: dibenzylidine sorbitol, titanium dioxide ($TiO_2$), talc, adipic acid, benzoic acid, and fine metal particles. It will be understood that the foregoing nucleating agents are given by way of example only, and that the foregoing list is not intended to be comprehensive. Other nucleating agents which may be used in connection with thermoplastic polymers are well known, and may also be used to prepare microporous materials in accordance with the present invention.

A melt blended mixture of the thermoplastic polymer, additive compound, and nucleating agent is first prepared. As used herein, the term "melt blended mixture" refers to the polymer, compound, and nucleating agent blend, wherein at least the polymer and compound are in the molten, semi-liquid, or liquid state. The nucleating agent in such a melt blended mixture may either be in the liquid state or in the solid state, depending upon the nucleating agent employed. All that is important is that, upon reaching the crystallization temperature of the thermoplastic polymer, the nucleating agent should, at that time, be in a solid state so as to be capable of inducing crystallization of the polymer. Hence, where the nucleating agent is a solid above the crystallization temperature of the polymer, the "melt blended mixture" is truly a mixture of liquid and solid, whereas if the nucleating agent is a liquid at some point above the crystallization temperature of the polymer, the "melt blended mixture" may in fact be a liquid solution of polymer, compound, and nucleating agent.

The melt blended mixture comprises from about 15 to about 80 parts by weight of the crystallizable thermoplastic polymer and about 85 to about 20 parts by weight of the blending compound. The nucleating agent represents from about 0.1 to about 5 parts by weight of the polymer weight, with the presently preferred range being from about 0.2 to about 2 parts by weight. The melt blended mixture is prepared as follows. First, the nucleating agent and the thermoplastic polymer are dry blended as solids, preferably at room temperature. To this polymer/nucleating mixture is added the blending compound, and the combined mixture is heated to at least the melting temperature of the crystallizable polymer.

It will be appreciated that the nucleating agent could alternatively be mixed with the blending compound first, or the polymer and blending compound could be first mixed together with the nucleating agent being added subsequently thereto, the order of mixing these components not being critical. Moreover, for ease in handling the melt blended mixture and in casting the same, it is convenient to initiate the formation of the melt blended mixture by heating the mixture at a temperature in the range of about 25° C. to about 100° C. above the melting temperature of the crystallizable polymer.

Microporous materials of the present invention may be prepared by casting a shaped article such as a sheet or layer from the melt blended mixture comprising the crystallizable polymer, blending compound, and nucleating agent. Depending upon the particular polymer employed, the cast article is cooled in a quench bath at an appropriate temperature, preferably between about 60° C. and about 225° C. below the equilibrium melting point of the pure crystallizable polymer, to provide a proper cooling rate. (For example, for pure polypropylene having an equilibrium melting point of 176° C., a cooling temperature between about 40° C. and about 60° C. is employed.) Some minor degree of experimentation may be required to identify the appropriate temperature range which produces optimum phase separation for a particular polymer/blending compound/nucleating agent system, this being well within the capability of those skilled in the art once apprised of the present disclosure.

The attainment of the microporous materials of the present invention is dependent upon the rate of cooling and the type and amount of nucleating agent employed. During cooling, heat is removed from the melt blended mixture until the crystallization temperature of the crystallizable polymer in the melt blended mixture is reached, and solidification and phase separation of the polymer can begin. Cooling temperatures greater than about 225° C. below the equilibrium melting point of the pure crystallizable polymer cause too rapid quenching of the melt blended mixture and can result in single phase films, which, although strong and transparent, are substantially incapable of being rendered uniformly microporous by stretching. Cooling at temperatures of less than about 60° C. below the equilibrium melting point of the pure crystallizable polymer provides for too slow of a phase separation (crystallization) of the crystallizable polymer with the resultant formation of relatively larger spherulites, thereby resulting in articles which are weak.

However, the use of a nucleating agent in accordance with the present invention substantially accelerates the crystallization of the polymer, thereby resulting in a more uniform, stronger microstructure because of the reduced spherulite size. The smaller, more uniform microstructure has an increased number of tie fibrils per unit volume and allows for greater stretching of the materials so as to provide higher void porosity and greater tensile strength than heretofore achievable.

Reference will now be made to the apparatus of FIG. 1 in order to illustrate one preferred method for practicing the present invention. The crystallizable thermoplastic polymer and nucleating agent are first dry blended together at room temperature and then introduced into the hopper 12 of an extruder apparatus 10. The blending compound is fed by a suitable feeding device 13 into the extruder 10 via a port 11 in the extruder wall intermediate the hopper 12 and an extruder exit 17. The extruder preferably has three zones, 14, 15, and 16 which are respectively heated at decreasing temperatures towards the extruder exit 17. A slot die 19, having a slit gap of about 25 to about 1000 micrometers, is positioned after the extruder. It is also preferable to utilize a suitable mixing device such as a static mixer 18 between the extruder exit 17 and the slot die 19. In passing through the extruder (and where used, the static mixer) the mixture of polymer, blending compound, and nucleating agent is heated to a temperature at or at least about 25° C. above the melting temperature of the crystallizable polymer (but below the thermal degradation temperature of the polymer), and is mixed to form a melt blended mixture that is extruded through the slot die 19 as a layer 25 into a liquid quench bath 20 maintained at a suitable temperature below the crystallization temperature of the crystallizable polymer using a suitable coolant, e.g., water. In some instances, e.g., where nylon is employed as the polymer, it is necessary to cool the solution in the extruder before it reaches the die to a temperature as much as 50° C. cooler than the equilibrium melting point of the pure polymer, in order to obtain phase separation in the sheet. The cooled film is then led from the quench bath 20 to an additive removal bath 21 containing a solvent capable of dissolving the additive compound. (For example, 1,1,1-trichloroethane may be used in bath 21 where the additive compound to be removed is mineral oil.) The film is then directed to a machine-direction stretching device 22 and a transverse direction stretching device 23, and then to a take-up roller 24 for winding into a roll. Stretching in two directions as done by the apparatus of FIG. 1 is, of course, optional.

The films of the present invention possess a tensile strength of at least about 10 kg/cm$^2$ and usually 50 kg/cm, or higher, depending upon the tensile strength of the crystallizable polymer employed, the zones of continuity, the extent of stretching, and the various process conditions.

The articles are rendered microporous by stretching until micropores are permanently developed or formed, typically to obtain at least an increase in length (elongation) of about 10%. Stretching to provide an elongation or total area increase of about 10% to about 1200% is typical. The actual amount of stretching required will depend upon the particular composition of the article and the degree of porosity desired. Stretching may be provided by any suitable device which can provide stretching in at least one direction, and may provide stretching both in that direction and in the transverse direction. Stretching should be uniform to obtain uniform and controlled porosity.

The microporous sheet materials of the present invention are preferably dimensionally stabilized according to conventional, well known techniques, such as by heating the stretched sheet, while it is restrained, at a heat stabilizing temperature.

Figure 2:
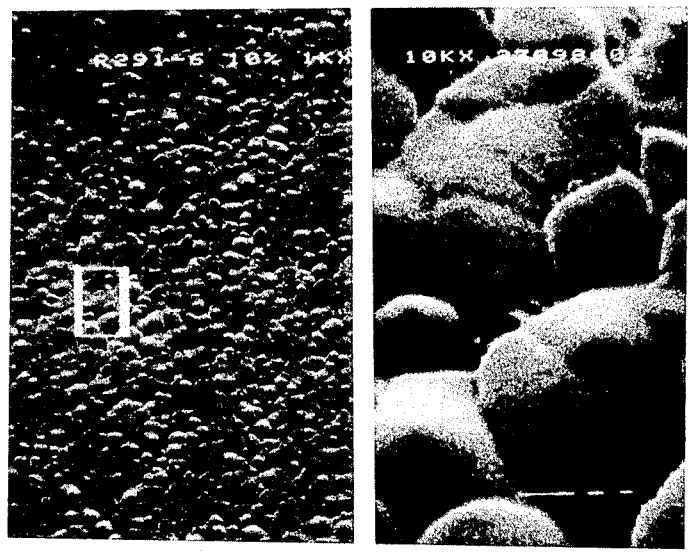
FIG. 2 is a photomicrograph (taken for purposes of comparison) of the surface structure of a polypropylene microporous sheet, made using mineral oil as the additive compound, but without the benefit of a nucleating agent, which microporous sheet has been stretched 10% in one direction. The left half of the photomicrograph is shown at a magnification of 1000X, and a portion of the left half (identified by a small rectangular border within the left half) is further enlarged to a magnification of 10,000X and is presented as the right half of the photomicrograph in order to show further detail of the surface structure of the microporous sheet. The bar marker placed in the lower right corner of the right half of the photomicrograph (solid white line followed by a double dash) is a scale marker to indicate length. Thus, in FIG. 2, as well as in each of FIGS. 4, 6, 8, 10, 12, and 14, the solid white line portion of the bar marker represents 10 microns in the left half and 1 micron in the right half of the photomicrograph.
Figure 3:
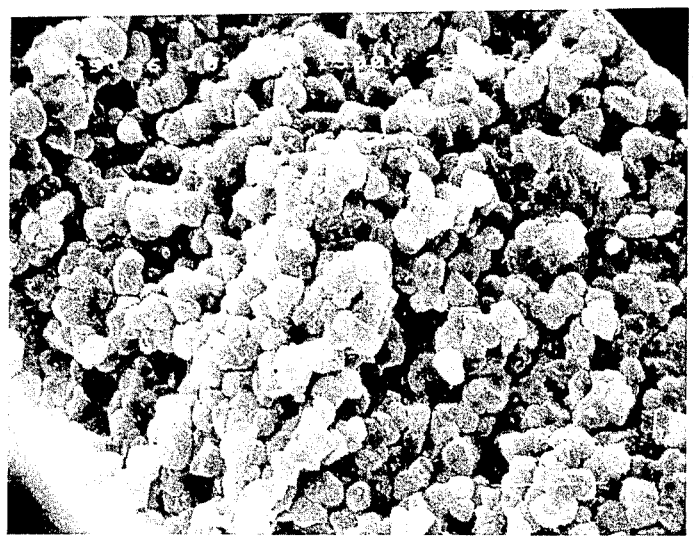
FIG. 3 is a photomicrograph of the internal structure of the microporous sheet of FIG. 2 taken along a cross section of the microporous sheet and shown at a magnification of 1500X. The bar marker placed in the lower right corner of the photomicrograph (solid white line followed by a double dash) is a scale marker to indicate length. Thus, in FIG. 3, as well as in each of FIGS. 5, 7, 9, 11, 13, and 15, the solid white line portion of the bar marker represents 10 microns.
Figure 4:
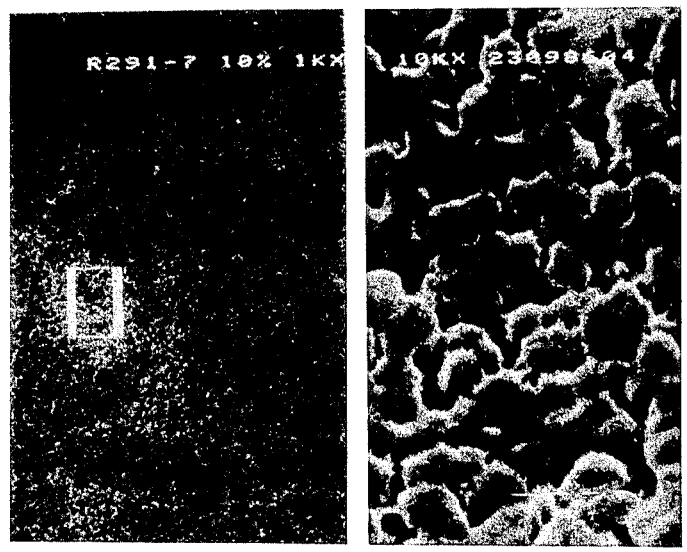
FIG. 4 is a photomicrograph of the surface structure of a polypropylene microporous sheet made in accordance with the present invention, that is, using a nucleating agent along with mineral oil as the additive compound, which microporous sheet has been stretched 10% in one direction. The left half of the photomicrograph is shown at a magnification of 1000X, and a portion of the left half (identified by a small rectangular border within the left half) is further enlarged to a magnification of 10,000X and is presented as the right half of the photomicrograph in order to show further detail of the surface structure of the microporous sheet.
Figure 5:
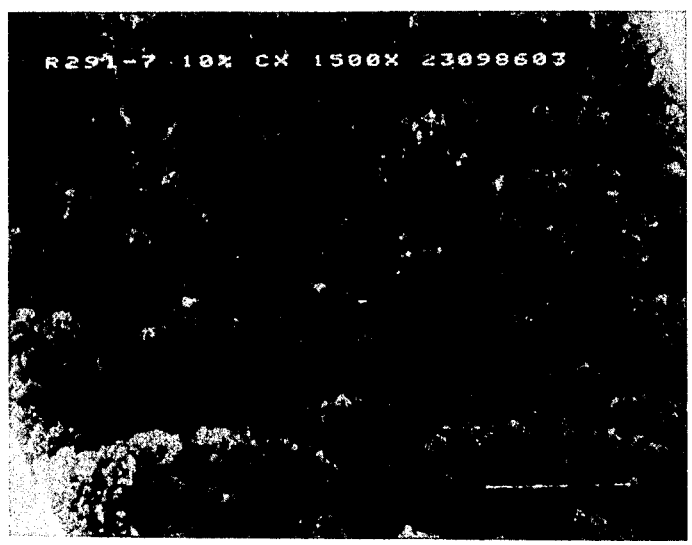
FIG. 5 is a photomicrograph of the internal structure of the microporous sheet of FIG. 4 taken along a cross section of the microporous sheet and shown at a magnification of 1500X.
Figure 6:
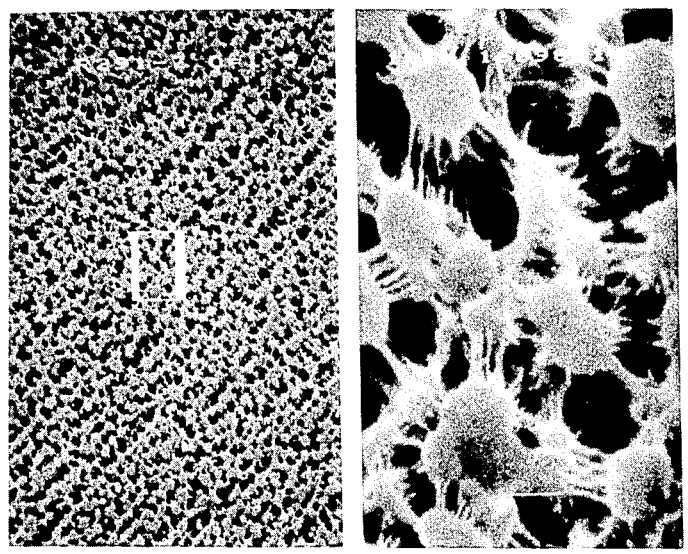
FIG. 6 is a photomicrograph of the surface structure of a polypropylene microporous sheet made with a nucleating agent in the same fashion as the microporous sheet of FIG. 4, except that the microporous sheet of this FIG. 6 has been biaxially stretched 1.5×1.5 for a total area increase of 125%. The left half of the photomicrograph is shown at a magnification of 1000X, and a portion of the left half (identified by a small rectangular border within the left half) is further enlarged to a magnification of 10,000X and is presented as the right half of the photomicrograph in order to show further detail of the surface structure of the microporous sheet.
Figure 7:
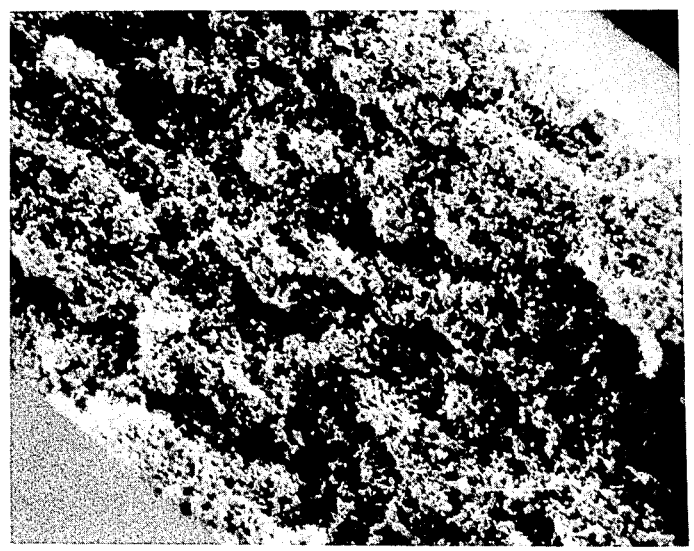
FIG. 7 is a photomicrograph of the internal structure of the microporous sheet of FIG. 6 taken along a cross section of the microporous sheet and shown at a magnification of 1500X.
Figure 8:
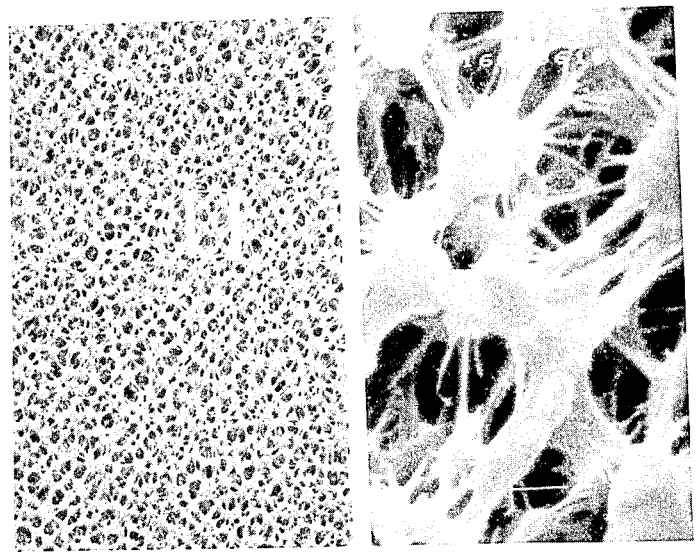
FIG. 8 is a photomicrograph of the surface structure of a polypropylene microporous sheet made with a nucleating agent in the same fashion as the microporous sheet of FIG. 4, except that the microporous sheet of this FIG. 8 has been biaxially stretched 2.0×2.0 for a total area increase of 300%. The left half of the photomicrograph is shown at a magnification of 1000X, and a portion of the left half (identified by a small rectangular border within the left half) is further enlarged to a magnification of 10,000X and is presented as the right half of the photomicrograph in order to show further detail of the surface structure of the microporous sheet.
Figure 9:
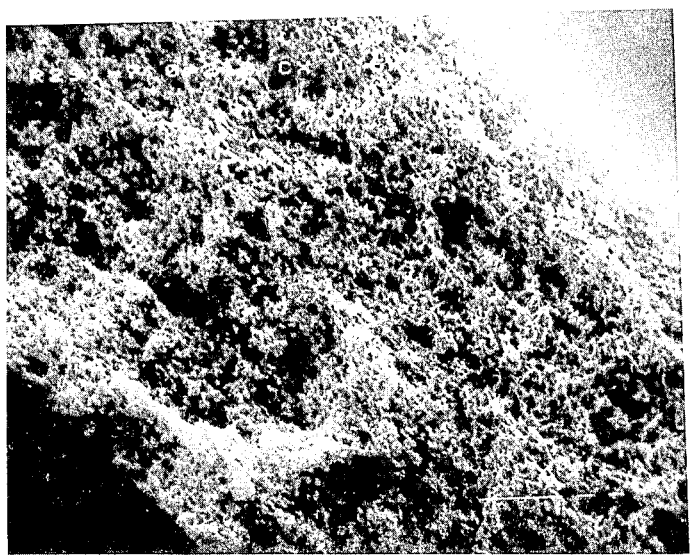
FIG. 9 is a photomicrograph of the internal structure of the microporous sheet of FIG. 8 taken along a cross section of the microporous sheet and shown at a magnification of 1500X.
Figure 10:
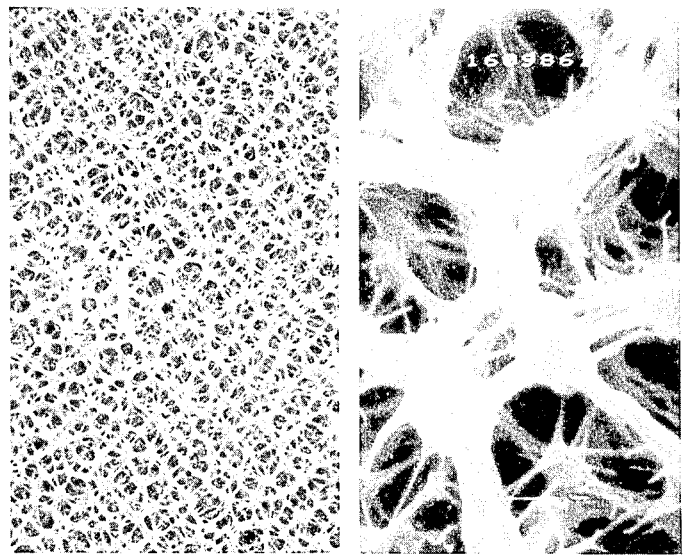
FIG. 10 is a photomicrograph of the surface structure of a polypropylene microporous sheet made with a nucleating agent in the same fashion as the microporous sheet of FIG. 4, except that the microporous sheet of this FIG. 10 has been biaxially stretched 2.5×2.5 for a total area increase of 525%. The left half of the photomicrograph is shown at a magnification of 1000X, and a portion of the left half (identified by a small rectangular border within the left half) is further enlarged to a magnification of 10,000X and is presented as the right half of the photomicrograph in order to show further detail of the surface structure of the microporous sheet.
Figure 11:
FIG. 11 is a photomicrograph of the internal structure of the microporous sheet of FIG. 10 taken along a cross section of the microporous sheet and shown at a magnification of 1500X.
Figure 12:
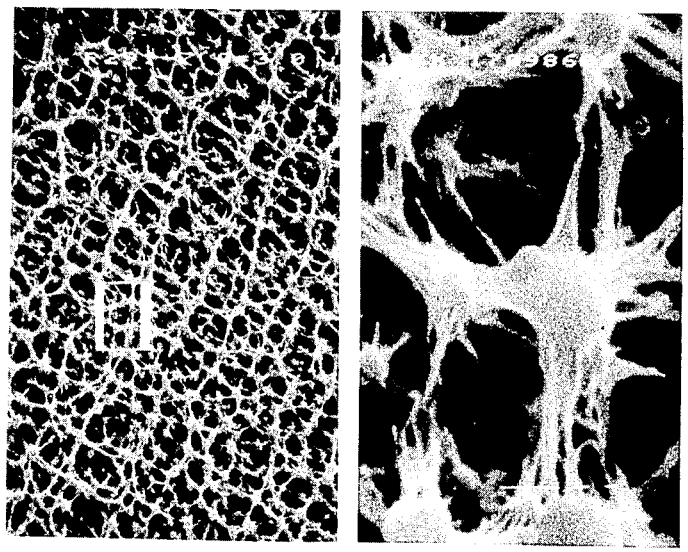
FIG. 12 is a photomicrograph of the surface structure of a polypropylene microporous sheet made with a nucleating agent in the same fashion as the microporous sheet of FIG. 4, except that the microporous sheet of this FIG. 12 has been biaxially stretched 3.0×3.0 for a total area increase of 800%. The left half of the photomicrograph is shown at a magnification of 1000X, and a portion of the left half (identified by a small rectangular border within the left half) is further enlarged to a magnification of 10,000X and is presented as the right half of the photomicrograph in order to show further detail of the surface structure of the microporous sheet.
Figure 13:
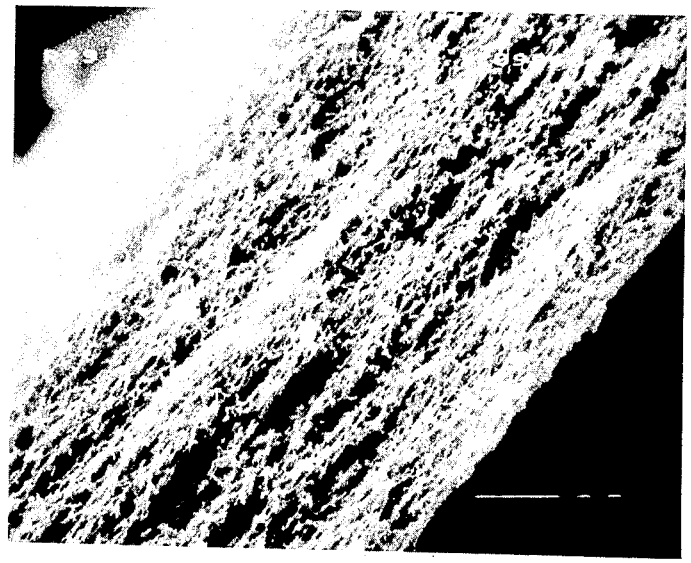
FIG. 13 is a photomicrograph of the internal structure of the microporous sheet of FIG. 12 taken along a cross section of the microporous sheet and shown at a magnification of 1500X.
Figure 14:
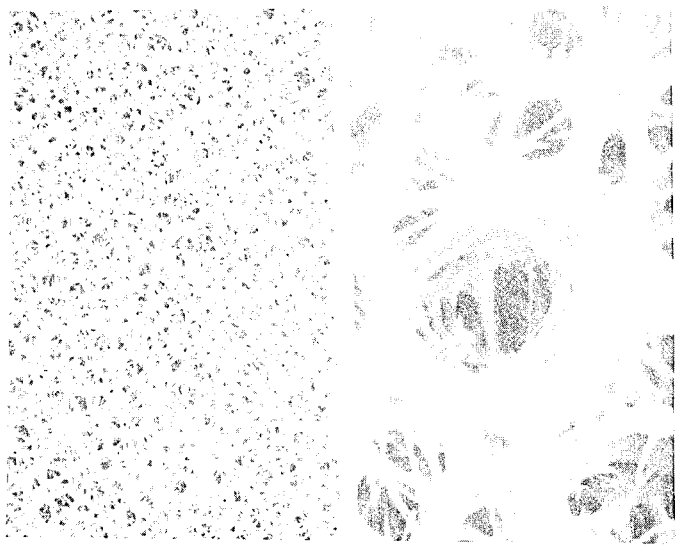
FIG. 14 is a photomicrograph of the surface structure of a polypropylene microporous sheet made with a nucleating agent in the same fashion as the microporous sheet of FIG. 4, except that the microporous sheet of this FIG. 14 has been biaxially stretched 3.5×3.5 for a total area increase of 1125%. The left half of the photomicrograph is shown at a magnification of 1000X, and a portion of the left half (identified by a small rectangular border within the left half) is further enlarged to a magnification of 10,000X and is presented as the right half of the photomicrograph in order to show further detail of the surface structure of the microporous sheet.
Figure 15:
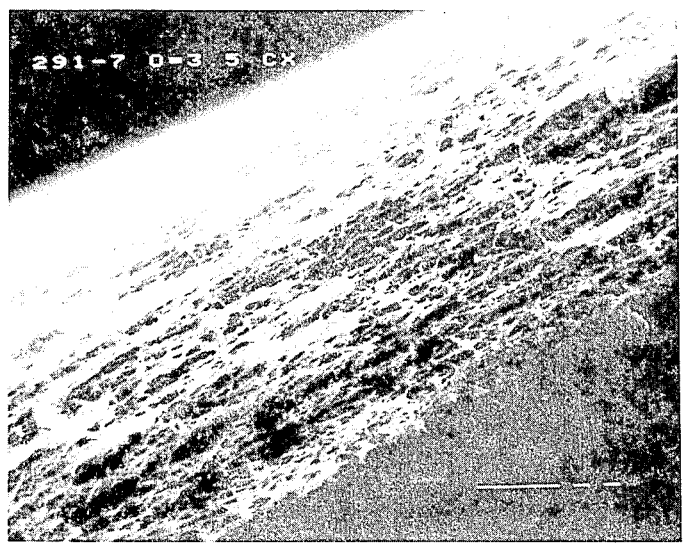
FIG. 15 is a photomicrograph of the internal structure of the microporous sheet of FIG. 14 taken along a cross section of the microporous sheet and shown at a magnification of 1500X.

Referring to the photomicrographs shown in FIGS. 2–15, the microporous materials made with a nucleating agent in accordance with the present invention (shown in FIGS. 4–15) may be compared with a microporous material made without such a nucleating agent (shown in FIGS. 2–3). (It should be noted that the blending compound had been removed prior to taking the photomicrographs of each of FIGS. 2–15.) As shown in FIGS. 4–15, the microporous materials of the present invention are composed of randomly dispersed, equi-axed, non-uniform shaped particles of thermoplastic polymer, which are considerably smaller than the polymer particles of the microporous material shown in FIGS. 2–3 where no nucleating agent was involved. FIGS. 4–15 also show that the particles are spaced from one another to provide a network of micropores therebetween, with particles being connected to each other by fibrils which radiate from each particle to adjacent particles. Advantageously, the number of fibrils per unit volume and the length of fibrils is greatly enhanced in the microporous materials of FIGS. 4–15 over the material of FIGS. 2–3.

The additive compound may be removed from the microporous sheet to provide a unique microporous sheet material formed only of the polymeric material with nucleating agent incorporated therein. Removal of the compound may be accomplished by solvent extraction, volatilization, or any other convenient method. Once the compound has been removed, the resultant microporous sheet may be imbibed, if desired, with various material to provide any one of a variety of specific functions, thereby providing unique articles. For example, the imbibing material may be a liquid, solvent solution, solvent dispersion, or solid. Such materials may be imbibed by any one of a number of known methods which result in the deposition of such materials within the porous structure of the microporous sheet. Some imbibing materials are merely physically placed within the microporous sheet. In some instances, the use of two or more reactive components as the imbibing materials permits their reaction within the microporous sheet structure. Examples of imbibing materials which might be employed in the present invention include medicaments, fragrances, antistatic agents, surfactants, pesticides, and solid particulate materials such as activated carbon and pigments. Certain materials, such as antistatic agents or surfactants, may be imbibed without first effecting removal of the compound.

The microporous sheet material, either before or after removal of the additive compound, may be further modified by the deposition thereon of any one of a variety of compositions, by any one of a variety of known coating or deposition techniques. For example, the microporous sheet material may be coated with metal by vapor deposition or sputtering techniques, or it may be coated with adhesives, aqueous or solvent-based coating compositions, or dyes. Coating may be accomplished by such other conventional techniques such as roll coating, spray coating, dip coating, or any other known coating techniques. Sheets of the microporous material may be coated, for example, with an antistatic material by conventional wet coating or vapor coating techniques.

The microporous sheet materials of the present invention may be laminated to any one of a variety of other structures, such as other sheet materials, to provide composite structures which include the microporous sheet materials of the present invention. Lamination can be accomplished by conventional techniques such as adhesive bonding, spot welding, or by other techniques which do not destroy or otherwise interfere with the porosity or create undesirable porosity or perforations.

The microporous materials of the present invention may be employed in a wide variety of situations where their microporous structures are useful. For example, they may be used in the ultrafiltration of colloidal matter, as diffusion barriers, or as separators in electrochemical cells. Further, they may be laminated to other materials and the laminate may be utilized to form such articles as raincoats or other outerwear or camping equipment such as tents and sleeping bags. The microporous sheets of the present invention may also be laminated to a woven cloth or a nonwoven fabric such as a nonwoven scrim, which may be used to produced a disposable protective garment for use, for example, in a hospital or in an electronic clean room or in other areas such as where caustic chemical spills may be a problem. The microporous sheet materials may be further utilized as filtering materials for cleaning antibiotics, beer, oils, bacteriological broths, for sample collection in air analysis, and for collecting microbiological specimens. They may also be utilized to make surgical dressings, bandages, and in other medical applications. Those of ordinary skill in the art will recognize that there are many other uses for microporous materials made in accordance with the present invention.

The following examples are given to show microporous materials which have been made in accordance with the present invention. However, it will be understood that the following examples are exemplary only, and are in nowise comprehensive of the many different types of microporous materials which may be made in accordance with the present invention. Unless otherwise specified, all parts and percentages set forth in the following examples are by weight.

As indicated herein, the use of a nucleating agent in accordance with the present invention significantly reduces the polymer spherulite size that forms upon crystallization of the melt blended mixture. As an unexpected result, significantly higher additive compound concentrations can be employed in the polymer/additive compound systems of the present invention. The following Examples 1-8 illustrate this effect of increasing the possible additive compound concentration when using a nucleating agent.

EXAMPLES 1-8

In Examples 1-4, which are comparative examples, four different molecular weight samples of crystallizable polypropylene polymer (having molecular weights of 106,000, 132,000, 240,000, and 243,000, respectively, and available under the trade designations Exxon 3085, Exxon 3014, Pro-fax 6823, and Pro-fax 6723, respectively, from Exxon Chemicals, Houston, Texas and Himont Incorporated, Wilmington, Del.) were separately extruded at a melt temperature of about 205° C. on a Berstorff 40 mm twin screw extruder fitted with a 30.5 cm by 0.04 mm slit gap sheeting die positioned above a water quench tank maintained at about 37.8° C. The polypropylene sample in each of Examples 1-4 was fed into the extruder, and the extruder was operated at about a 227 cc/min throughput rate to produce a film collected at the rate of about 7.6 meters per minute. Simultaneously, mineral oil (available under the trade designation Amoco White Mineral Oil #31 USP Grade from Amoco Oil Co.), having a boiling point of about 200° C. and a standard Saybolt viscosity of 360-390 at 38° C. (about 80 centistokes) was introduced into the twin screw extruder through an injection port at a rate such that the highest possible mineral oil concentration was mixed with the polypropylene sample that would still provide a useful film. (A useful film is considered one that can be oriented in one direction to at least 10% without breaking or crumbling to the touch.) Each polypropylene/mineral oil melt was extruded in film form and was stretched 10% in order to show that a useful film was produced. Then each film was soaked in 1,1,1-trichloroethane for about 2 minutes in a restraining device in order to remove the mineral oil, and dried at room temperature. The maximum percent of mineral oil which could be mixed with each polypropylene sample and still produce a useful film is reported in Table I below, along with other pertinent data regarding Examples 1-4.

TABLE I

| Example | Molecular Weight of Polypropylene Polymer (g) | Melt Flow Index of Polymer (g/10 min) | Maximum % Mineral Oil which will form useful film | Polymer % | Compound/ Polymer Ratio | Bubble Point (um) |
|---|---|---|---|---|---|---|
| 1 | 106,000 | 34.0 | 29.1 | 70.9 | 0.41 | 0.234 |
| 2 | 132,000 | 12.0 | 31.9 | 68.1 | 0.47 | 0.219 |
| 3 | 240,000 | 0.4 | 50.7 | 49.3 | 1.03 | 0.232 |
| 4 | 243,000 | 0.8 | 51.3 | 48.7 | 1.05 | 0.282 |

In each of Examples 1-4, the molecular weight of the polypropylene polymer was determined by gel permeation chromotography (GPC) using a Jordi ultra high mixed bed column on a Waters 150° C. high temperature chromatograph. In this regard, the molecular weight was determined by employing a polystyrene calibration curve converted to polypropylene-polyethylene equivalent molecular weight. Thus, the values reported in Table I (as well as Table II) are weight average molecular weights.

As stated, Examples 1-4 are merely comparative examples, and should be compared against Examples 5-8 which involve the use of a nucleating agent in accordance with the present invention. Hence, Examples 5, 6, 7, and 8 were conducted identically to Examples 1, 2, 3, and 4, respectively, with the sole exception that a nucleating agent was employed in each of Examples 5-8. For this purpose, about 0.30% by weight of a dibenzylidine sorbitol nucleating agent (available from Milliken Chemical under the trade designation Millad 3905) was dry blended with the polypropylene polymer before introducing the polymer into the extruder. Again, the highest possible mineral oil concentrations were determined where a useful film was formed. The results of Examples 5-8 are reported in Table II below.

TABLE II

| Example | Molecular Weight of Polypropylene Polymer (g) | Melt Flow Index of Polymer (g/10 min) | Maximum % Mineral Oil which will form useful film | Polymer % | Compound/ Polymer Ratio | Bubble Point (um) |
|---|---|---|---|---|---|---|
| 5 | 106,000 | 34.0 | 49.0 | 51 | .96 | 0.107 |
| 6 | 132,000 | 12.0 | 53.7 | 46.3 | 1.16 | 0.113 |
| 7 | 240,000 | 0.4 | 66.1 | 33.9 | 1.95 | 0.127 |
| 8 | 243,000 | 0.8 | 66.8 | 33.2 | 2.01 | 0.135 |

It should be noted that in Table II above, the small percentage of nucleating agent employed was ignored in calculating the polymer and mineral oil percentages and compound/polymer ratios. As seen by comparing the results tabulated in Tables I and II, the amount of mineral oil additive which could be employed in making the microporous sheets of Examples 5-8 increased dramatically when using a nucleating agent in accordance with the present invention. It is noted, for example, that the compound to polymer ratio for Example 6 employing a nucleating agent in accordance with the present invention was about 247% of the compound to polymer ratio calculated for corresponding comparative Example 2. Hence, a dramatic increase in the amount of compound is achieved by using a nucleating agent, thereby providing the capability of producing a wide variety of microporous materials with a wide variety of useful porosity ranges and other properties which were heretofore not possible.

cal properties for each of films A-H are reported in Table III below.

TABLE III

| Film | From Example No. | Nucleating Agent | % Area Increase | Stretch Ratio | Gurley Seconds | Bubble Point (um) | Density (g/cc) | % Void Volume | Bulk Tensile Strength (Kpa) | % Elongation at Break | Matrix Tensile Strength (Kpa) |
|---|---|---|---|---|---|---|---|---|---|---|---|
| A | 3 | NO | 10 | 1.1:1 | 120.2 | .232 | .760 | 15.2 | 10694 | 26.7 | 12583 |
| B | 3 | NO | 50 | 1.5:1 | * | * | * | * | * | * | * |
| C | 9 | YES | 10 | 1.1:1 | 1012.0 | .107 | .729 | 19.0 | 12307 | 147.0 | 15196 |
| D | 9 | YES | 125 | $(1.5)^2$ | 30.0 | .283 | .440 | 51.1 | 6847 | 129.0 | 14003 |
| E | 9 | YES | 300 | $(2.0)^2$ | 15.0 | .333 | .270 | 70.0 | 6633 | 62.0 | 22132 |
| F | 9 | YES | 525 | $(2.5)^2$ | 11.0 | .369 | .264 | 70.8 | 6426 | 18.0 | 22008 |
| G | 9 | YES | 800 | $(3.0)^2$ | 7.0 | .389 | .178 | 80.2 | 5930 | 10.0 | 29930 |
| H | 9 | YES | 1125 | $(3.5)^2$ | 6.0 | .370 | .163 | 81.9 | 6543 | 8.0 | 36156 |

*Sample broke during stretching
Film A was used in the preparation of the photomicrographs of FIGS. 2 and 3. Similarly, Films C, D, E, F, G, and H were used in the preparation of the photomicrographs of FIGS. 4-5, FIGS. 6-7, FIGS. 8-9, FIGS. 10-11, FIGS. 12-13, and FIGS. 14-15, respectively.

The photomicrographs of FIGS. 4-15 illustrate the smaller particle sizes and increased number of tie fibrils per unit volume which are obtained when using a nucleating agent in accordance with the present invention. From these photomicrographs, it is estimated that the use of a nucleating agent serves to reduce the particle size by up to at least about 85%, to increase the number of fibrils per unit volume up to at least about 815%, and to increase the length of the fibrils by up to at least about 700%. These surprising benefits are at least in part responsible for the greater stretchability of the microporous materials of the present invention. The following Example 9 emphasizes the dramatic increase in stretchability of the microporous material which is achieved in the present invention.

EXAMPLE 9

In this example, a microporous material within the scope of the present invention was made in accordance with Example 7, with the sole exception that 52.6% mineral oil was used in this example. (As in Example 7, 0.30% of the dibenzylidine sorbitol (Millad 3905) nucleating agent was employed, and the remainder was polymer.) All other conditions were identical to those used in Example 7. The resultant films from this example, as well as films from Example 3 (for comparison purposes), were solvent washed in 1,1,1-trichloroethane for five minutes in a restraining device to remove the mineral oil, and were then dried at room temperature. Two films prepared in accordance with Example 3 (films A and B) and six films prepared in accordance with this Example 9 (films C-H) were stretched different degrees at about 132° C. in order to compare the various porous and physical properties of films C-H made in accordance with the present invention versus films A and B where no nucleating agent was employed. Comparison films A and B were stretched 10% and 50% in one direction only, with film B failing or breaking during the stretching. Film C of the present invention was stretched 10% in one direction, and thus may be compared with comparative film A. Films D, E, F, G, and H were stretched in two directions in order to achieve a percent area increase of 125%, 300%, 525%, 800%, and 1125%, respectively. The porous and other physi- In Table III above, the values reported for "Gurley Seconds" are measurements of the time in seconds that it took to pass 50 cc of air through the film according to ASTM-D-726-58 Method A. The bubble point values represent the largest effective pore size measured in microns according to ASTM-F-316-80. The density is a measurement in grams/cc and comes from the specific gravity measurement determined according to ASTM-D-792-66. The void volume is calculated based on the measured density of the porous membrane and the given density of the polymer, according to the following formula:

$$\text{Void Volume} = \left(1 - \frac{\text{measured membrane density}}{\text{given polymer density}}\right) \times 100\%$$

The bulk tensile strength and the percent elongation at break were measured on an Instron Model 1122 according to ASTM-D-882. The matrix tensile strength relates to the polymer matrix strength and is determined using the following formula:

$$\text{Matrix tensile strength} = \left(\frac{\text{bulk tensile strength}}{100\% - \% \text{ void volume}}\right) \times 100$$

The values reported in Table III under "% Area Increase" represent the percentage area increase for the films which were stretched while heated at 132° C. After such stretching, each of films A-H was cooled to room temperature, and then each of the films was again stretched in one direction according to ASTM-D-882 until breaking. This additional amount of stretching that the cooled films experienced before breaking is reported in Table III under "% Elongation at Break."

As seen in Table III, film H of Example 9 was stretched 3.5 times in each direction so as to increase its area by 1125%, yet film B of Example 3 could not be stretched to more than a 50% area increase without first rupturing. This dramatically illustrates the increased stretchability which is achieved by using a nucleating agent in accordance with the present invention. Moreover, a wide range of porosity values and physical properties is obtained in each of films C-H, thereby providing numerous possibilities of heretofore impossible microporous films having a wide variety of porous and physical properties. It is noteworthy that the matrix tensile strength of film H was over 287% greater than the matrix tensile strength of film A. Moreover, greatly increased void volumes were achieved in films C-H, thereby providing films with greater porosity.

In order to more dramatically illustrate the surprising results achieved in the present invention, a failed example, namely, Example 4 of U.S. Pat. No. 4,539,256, was carried out using two different nucleating agents, namely, dibenzylidine sorbitol and adipic acid, in accordance with the present invention, and are reported as Examples 10 and 11 below. Although U.S. Pat. No. 4,539,256 reports that its Example 4 was a failure and resulted in a film which could not be stretched without crumbling to the touch, the films of Examples 10 and 11 below, made with a nucleating agent in accordance with the present invention, produced highly successful microporous materials.

EXAMPLES 10 and 11

In these examples, the procedure of Example 4 in U.S. Pat. No. 4,539,256, which patent is incorporated herein by reference, was followed with the following exceptions. In Example 10, about 0.30% (based on the polymer weight) of a dibenzylidine sorbitol (Millad 3905) nucleating agent was first dry blended with the polypropylene polymer, while about 0.30% of an adipic acid nucleating agent was dry blended with the polypropylene polymer in Example 11. Furthermore, a 60:40 blend of Pro-fax 6723 polypropylene polymer: mineral oil was extruded at a melt temperature of about 245° C. Also, in Examples 10 and 11, the microporous materials were melt quenched on a casting wheel maintained at about 45° C. instead of in a water quench bath. Suitable microporous films were formed in each of Examples 10 and 11, and their properties are summarized in Table IV below.

desirable to use the highest available molecular weight polymer and a low extrusion profile so as to reduce polymer degradation. Furthermore, higher compound additive concentrations can be achieved by using lower melt temperatures, lower quench temperatures, and alternative quench methods. These features, when combined with the use of a nucleating agent in accordance with the present invention, result in a useful porous film, an example of which is given below in Example 12.

EXAMPLE 12

In this example, a procedure identical to that of Example 8 was followed with the following exceptions. In Example 12, an extrusion temperature of 168° C. was employed, and the film was cast onto a wheel, in order to achieve quenching, at a quench temperature of about 27° C. As a result, a 25:75 ratio of 243,000 molecular weight polypropylene:mineral oil was achieved in fabricating useful microporous films. The lower melt temperature, lower quench temperature, and different method of quenching used in this Example 12 are the reasons why a higher compound additive concentration was achievable in this example over that achieved in Example 8. The resultant film from this example was soaked in 1,1,1-trichloroethane for five minutes in a restraining device to remove the mineral oil, and the film was dried at room temperature. The film was then stretched 75% in one direction and had the porous charcteristics set forth in Table V below.

TABLE V

| Example | Nucleating Agent | Stretch Ratio | Gurley Seconds to pass 50 cc | Bubble Point (um) | Density g/cc | % Void Volume |
|---------|------------------|---------------|------------------------------|-------------------|--------------|---------------|
| 12 | dibenzylidine sorbitol | 1.75:1 | 3370 | .084 | .37 | 58.9 |

In Examples 13-15 below, further examples are set forth wherein a relatively high additive compound concentration was achieved using high density polyethylene as the polymer.

EXAMPLES 13-15

TABLE IV

| Example | Nucleating Agent | % Area Increase | Stretch Ratio MD × TD | Gurley Seconds to pass 50 cc | Bubble Pt. (um) | Density g/cc | % Void Volume |
|---------|------------------|-----------------|-----------------------|------------------------------|-----------------|--------------|---------------|
| 10 | dibenzylidine sorbitol | 800 | 3.0 × 3.0 | 5100 | .081 | .272 | 69.8 |
| 11 | adipic acid | 525 | 2.5 × 2.5 | 31.2 | .42 | .26 | 71.0 |
| 4 (from U.S. Pat. No. 4,539,256) | none | NM | NM | NM | NM | NM | NM |

NM = not measurable, because sample could not be stretched without crumbling to the touch.

As seen in Table IV above, the microporous films made in Examples 10 and 11 were quite successful, with the film Example 10 being biaxially stretched 3.0×3.0 (or 300% in both the machine direction and the transverse direction), and the film of Example 11 being biaxially stretched 2.5×2.5 (or 250% in both directions). Note, by comparison, that the film of Example 4 from U.S. Pat. No. 4,539,256 could not even be stretched 10% in one direction without crumbling to the touch. The various other porosity parameters set forth for the films of Examples 10 and 11 further show the usefulness of the microporous films formed in those examples.

If it is desired to increase the amount of additive compound employed so as to vary the porous properties of the resultant microporous film formed, it is typically In Examples 13-15, a high density polyethylene polymer having a weight average molecular weight of about 160,000 and a melt flow index of about 0.07 (available under the trade designation GM 9255 F2 from American Hoechst Company, Leominster, Mass.) was extruded at a melt temperature of about 145° C. on a Berstorff 40 mm twin screw extruder fitted with a 15.25 cm×0.04 mm slit gap sheeting die after which was positioned a chill wheel maintained at about 32° C. In each of these examples, about 0.30% by weight (based upon the polymer weight) of a dibenzylidine sorbitol nucleating agent (Millad 3905) was dry blended with the polyethylene polymer before introduction of the polymer into the extruder. The polyethylene/ Millad 3905 sample in each of Examples 13-15 was fed into the extruder, and the extruder was operated at about a 14.0 kg/hr throughput rate to produce a sheet collected at a rate of about 3.5 meters per minute. Simultaneously, mineral oil (available under the trade designation Amoco White Mineral Oil #31 USP Grade from Amoco Oil Co.) having a boiling point of about 200° C. and a standard Saybolt viscosity of 360-390 at 38° C. (about 80 centistokes) was introduced into the twin screw extruder through an injection port at a rate such that a polyethylene polymer:mineral oil compound ratio of 24:76, 20:80, and 17:83 was achieved in each of Examples 13, 14, and 15, respectively. After casting on the chill wheel, each polyethylene/mineral oil/Millad 3905 film was solvent washed in 1,1,1-trichloroethane for about 10 minutes in a restraining device to remove the mineral oil. Each film was then dried at room temperature and biaxially stretched 3.0×3.0 at 85° C.

Useful films were formed in each of Examples 13-15, and various porosity parameters are given for the films of these examples in Table VI below.

TABLE VI

| Example | Polymer:Mineral Oil Ratio | Density (g/cc) | % Void Volume |
|---|---|---|---|
| 13 | 24:76 | 0.074 | 92.2 |
| 14 | 20:80 | 0.056 | 94.1 |
| 15 | 17:83 | 0.048 | 94.9 |

As seen from Example 15, it is possible to utilize as much as 83% or more by weight of additive compound and still obtain a useful film within the scope of the present invention. For other applications, it may be desirable to achieve a low additive compound concentration. Example 16 below provides such an example wherein a relatively low additive compound concentration was achieved.

EXAMPLE 16

In Example 16, a sample of crystallizable polypropylene polymer having a molecular weight of 132,000 and available under the trade designation Exxon 3014 from Exxon Chemicals was dry blended with about 0.25% by weight (based upon the polymer weight) of a Millad 3905 nucleating agent. The polymer/nucleating agent mixture was melt mixed with mineral oil at a polypropylene polymer: mineral oil ratio of about 78:22. Extrusion of the melt blended mixture was achieved at a melt temperature of about 205° C. on a 2.54 cm Wayne extruder fitted with a 3.175 cm diameter tubular film die gapped at about 0.0028 cm. The extruder was operated at about a 42 cc/min throughput rate to produce a tubular film collected at a rate of about 3 m/min. The extruded film was air quenched at room temperature, soaked in 1,1,1-trichloroethane for about 5 minutes in a restraining device to remove the mineral oil, dried at room temperature, and biaxially stretched 1.5×1.5 for a total area increase of 125% at a temperature of about 93° C. The resultant tubular film was found to have useful porous properties, including a Gurley second value (to pass 50 cc of air) of about 527.0 and a bubble point of about 0.08 microns.

Nucleated polymer/compound additive blends tend to respond more rapidly to a decrease in quench temperature than their nonnucleated counterparts. Since the nucleating agent increases the rate of crystallization of the polymer, when coupled with a low quench or melt temperature, too rapid of a quench may occur, resulting in a single phase film, which, although strong and transparent, is substantially incapable of being rendered uniformly microporous by subsequent removal of the compound additive and stretching. Thus, some care must be given to regulate the quench temperature and melt temperature so as not to cause too rapid of a quench. Examples 17 and 18 below illustrate the effects of decreasing the quench temperature for one specific polymer/compound/nucleating agent system.

EXAMPLES 17 and 18

In these examples, a procedure identical to that used in Example 7 was followed with the following exceptions. In Example 17, the melt blended mixture was quenched at 24° C., and in Example 18, the melt blended mixture was quenched at 10° C. The resultant films were stretched 10% in one direction and then solvent washed in 1,1,1-trichloroethane in a restraining device to remove the mineral oil. Table VII gives the porous properties observed for these films, and compares them to the film of Example 7 made at a quench temperature of 37.8° C.

TABLE VII

| Example | Quench Temperature °C. | Gurley Seconds to pass 50 cc | Bubble Point (um) | Density (g/cc) | % Void Volume |
|---|---|---|---|---|---|
| 7 | 37.8° | 320.9 | .127 | .648 | 28.0 |
| 17 | 24.0° | NM | NM | .820 | 9.0 |
| 18 | 10.0° | NM | NM | .886 | 1.3 |

NM = not measurable according to ASTM-D-726-5B Method A or ASTM-F-316-80

As the quench temperature was decreased from 37.8° C. in Example 7 to 24° C. in Example 17 and to 10° C. in Example 18, the Gurley Seconds time response increased beyond measurement, and the internal void volume declined sharply. Thus, Examples 17 and 18 illustrate the need for choosing a quench temperature for a given system which is not so low as to destroy the desired microporous properties of the resultant material. However, it should be understood that even the lower quench temperatures of Examples 17 and 18 could be suitable if other parameters were varied, e.g., if the additive concentration and melt temperature were increased.

The primary criteria for selecting an appropriate nucleating agent for use in the present invention are: (1) that the nucleating agent be a solid at the crystallization temperature of the polymer in the polymer/compound/nucleating agent blend, (2) that the nucleating agent be capable of inducing crystallization of the polymer at the crystallization temperature, and (3) that effective size reduction of the polymer particles over a nonnucleated system is achieved.

In order to screen useful nucleating agents that will reduce the particle size or nodule size of the polymer as it phase separates from the compound additive in a liquid-solid phase separation system, a simple test has been devised. This test involves melting and mixing on a laboratory hot plate several grams of the polymer with an appropriate additive at a 30:70 to 50:50 polymer to compound additive weight ratio with approximately 1% by weight (based on the polymer weight) of the nucleating agent to be tested. The following Examples 19-29 describe examples of such testing and give the results for various nucleating agents in various polymer/compound additive systems. It will be appreciated that, although all nucleating agents may not work for each given polymer/compound additive system, the test outlined herein provides a simple method for determining whether or not a given nucleating agent would be suitable for a given application of the present invention.

EXAMPLES 19-29

In each of Examples 19-29, about 0.02 grams of a nucleating agent (representing about 1% of the polymer weight) were added to about 1.8 grams of polymer and about 4.2 grams of an appropriate compound additive (a 30:70 polymer:compound additive weight ratio), and the combination was melt mixed on a laboratory hot plate. After melt mixing to form a solution, each sample was water quenched at about 21° C. Each sample was then soaked in 1,1,1-trichloroethane to remove the additive, and allowed to dry. Freeze fractured samples were viewed on a scanning electron micrograph and were checked for polymer nodule size reduction at the same magnification as a control nonnucleated system. Table VIII gives the results of several polymer/compound additive/nucleating agent systems screened in this manner.

TABLE VIII

POLYMER/COMPOUND/NUCLEATING AGENT HOT PLATE TEST

| Example | Polymer | Compound Additive | Nucleating Agent | Nodule Size Reduction? |
|---|---|---|---|---|
| 19 | Polypropylene | Mineral Oil | Dibenzylidine sorbitol (Millad 3905) | Yes |
| 20 | Polypropylene | Mineral Oil | Titanium dioxide | Yes |
| 21 | Polypropylene | Mineral Oil | Adipic acid | Yes |
| 22 | Polypropylene | Mineral Oil | Benzoic acid | Yes |
| 23 | Polyethyleneterephthalate | Diethylphthalate | Dibenzylidine sorbitol (Millad 3905) | No |
| 24 | Polyethyleneterephthalate | Diethylphthalate | Titanium dioxide | No |
| 25 | Nylon 6-11 copolymer | Triethylene Glycol | Dibenzylidine sorbitol (Millad 3905) | Yes |
| 26 | Polyvinylidene fluoride | Dibutylphthalate | Dibenzylidine sorbitol (Millad 3905) | Yes |
| 27 | Polypropylene | Mineral Oil | Fine copper particles | Yes |
| 28 | Polypropylene (93%)-Polyethylene (7%) copolymer | Mineral Oil | Dibenzylidine sorbitol (Millad 3905) | Yes |
| 29 | Polypropylene | Mineral Oil | Talc | Yes |

As seen in Table VIII, Examples 19-22 and 25-29 resulted in successful nodule size reduction, indicating that the nucleating agents employed in those examples would be suitable for use in making improved microporous materials from the polymers and compound additives set forth in those examples. Although the systems of Examples 23 and 24 did not provide satisfactory nodule size reduction, other nucleating agents or conditions could be tried for the same polymer/compound additive systems set forth in those examples. Hence, it will be seen from Examples 19-29 that only a very minor amount of experimentation is needed in order to determine whether a particular polymer/compound additive/nucleating agent system will provide a useful and improved microporous material and therefore fall within the scope of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method of making a microporous article, comprising the steps of:
   melt blending to form a mixture comprising about 15 to about 80 parts by weight of crystallizable thermoplastic polymer, sufficient nucleating agent to initiate subsequent crystallization of said thermoplastic polymer at a significantly greater number of crystallization sites as compared to crystallization without said nucleating agent, and about 85 to about 20 parts by weight of a compound with which said thermoplastic polymer is miscible and in which said thermoplastic polymer will dissolve at the melting temperature of said thermoplastic polymer but which will phase separate on cooling to a temperature at or below the crystallization temperature of said thermoplastic polymer;
   forming a shaped article of the melt blended mixture;
   cooling said shaped article to a temperature at which said nucleating agent initiates said crystallization sites within said thermoplastic polymer so as to cause phase separation to occur between said compound and said polymer, thereby providing an article comprising an aggregate of a first phase comprising particles of crystallized thermoplastic polymer in a second phase comprising said compound with adjacent thermoplastic polymer particles being distinct but having a plurality of zones of continuity, wherein said particles have a size which is significantly reduced as compared to the size said particles would have if no nucleating agent were present; and
   stretching said shaped article in at least one direction to separate adjacent particles of thermoplastic polymer from one another to provide a network of interconnected micropores therebetween and to permanently attenuate the thermoplastic polymer in said zones of continuity to form fibrils.

2. A method as defined in claim 1 wherein the amount of said nucleating agent is about 0.1 to about 5 parts by weight per 100 parts of polymer.

3. A method as defined in claim 1 wherein said particles contain enough of said nucleating agent such that the number of fibrils per unit volume is significantly increased over the number of fibrils per unit volume that would exist between particles if no nucleating agent were present.

4. A method as defined in claim 1 wherein said particles contain enough of said nucleating agent such that the length of the fibrils is significantly increased over the fibril length said microporous article would have if no nucleating agent were present.

5. A method as defined in claim 1 wherein said particles contain enough of said nucleating agent such that the tensile strength of said microporous article is significantly increased over the tensile strength said microporous article would have if no nucleating agent were present.

6. A method as defined in claim 1 wherein said particles contain enough of said nucleating agent such that the stretchability of the material forming said microporous article is significantly increased over the stretchability the material forming the microporous article would have if no nucleating agent were present.

7. A method as defined in claim 1 wherein the average size of said particles is about 2 microns or less.

8. A method as defined in claim 1 wherein said stretching step comprises biaxially stretching said shaped article.

9. A method as defined in claim 1 wherein said stretching step provides an area increase in said shaped article of from about 10% to about 1200% over the original area of said shaped article.

10. A method as defined in claim 1 further comprising the step of removing said compound.

11. A method as defined in claim 1 further comprising the step of dimensionally stabilizing said stretched article by heating the stretched article, while it is restrained, to a heat stabilizing temperature.

12. A method as defined in claim 1 wherein said nucleating agent is selected from the group consisting of aryl alkanoic acid compounds, benzoic acid compounds, and dicarboxylic acid compounds.

13. A method as defined in claim 1 wherein said nucleating agent is dibenzylidine sorbitol.

14. A method as defined in claim 1 wherein said nucleating agent is selected from the group consisting of titanium dioxide, talc, adipic acid, benzoic acid, and fine metal particles.

15. A microporous material comprising crystallizable thermoplastic polymer and a nucleating agent, said microporous material having an internal structure characterized by a multiplicity of spaced, randomly disposed, non-uniform shaped, equiaxed particles of said thermoplastic polymer, adjacent particles throughout said material being separated from one another to provide said material with a network of interconnected micropores and being connected to each other by a plurality of fibrils consisting of said thermoplastic polymer, said particles containing enough of said nucleating agent such that the size of said particles is significantly reduced over the size said particles would have if no nucleating agent were present.

16. A microporous material as defined in claim 15 wherein said particles contain enough of said nucleating agent such that the number of fibrils per unit volume is significantly increased over the number of fibrils that would exist per unit volume if no nucleating agent were present.

17. A microporous material as defined in claim 15 wherein said particles contain enough of said nucleating agent such that the length of the fibrils is significantly increased over the fibril length said microporous material would have if no nucleating agent were present.

18. A microporous material as defined in claim 15 wherein said particles contain enough of said nucleating agent such that the tensile strength of said microporous material is significantly increased over the tensile strength said microporous material would have if no nucleating agent were present.

19. A microporous material as defined in claim 15 wherein said particles contain enough of said nucleating agent such that the stretchability of the material forming said microporous material is significantly increased over the stretchability the material forming the microporous material would have if no nucleating agent were present.

20. A microporous material as defined in claim 15 wherein the average size of said particles is about 2 microns or less.

21. A microporous material as defined in claim 15 wherein said nucleating agent comprises from about 0.1 to about 5 parts by weight per 100 parts of polymer.

22. A microporous material as defined in claim 15 wherein said nucleating agent is selected from the group consisting of aryl alkanoic acid compounds, benzoic acid compounds, and dicarboxylic acid compounds.

23. A microporous material as defined in claim 15 wherein said nucleating agent is dibenzylidine sorbitol.

24. A microporous material as defined in claim 15 wherein said nucleating agent is selected from the group consisting of titanium dioxide, talc, adipic acid, benzoic acid, and fine metal particles.

25. A microporous material as defined in claim 15 wherein said thermoplastic polymer is polypropylene.

26. A microporous material comrising about 15 to about 80 parts by weight of crystallizable thermoplastic polymer, about 0.1 to about 5 parts by weight of a nucleating agent which is capable of inducing crystallization of said thermoplastic polymer, and about 85 to about 20 parts by weight of a compound with which said thermoplastic polymer is miscible and in which said thermoplastic polymer will dissolve at the melting temperature of said thermoplastic polymer but will phase separate on cooling to a temperature at or below the crystallization temperature of said thermoplastic polymer, said microporous material having an internal structure characterized by a multiplicity of spaced, randomly dispersed, non-uniform shaped, equiaxed particles of said thermoplastic polymer coated with said compound, adjacent coated particles throughout said material being separated from one another to provide said material with a network of interconnected micropores and said adjacent thermoplastic polymer particles being connected to each other by a plurality of fibrils consisting of said thermoplastic polymer, said particles containing enough of said nucleating agent such that the size of said particles is reduced over the size said particles would have if no nucleating agent were present.

27. A microporous material as defined in claim 26 wherein said particles contain enough of said nucleating agent such that the compound to polymer ratio of said microporous material is significantly increased over the maximum compound to polymer ratio the microporous material would have if no nucleating agent were present.

28. A microporous material as defined in claim 26 wherein said thermoplastic polymer and said compound, respectively, are selected from the group consisting of:
   (a) polypropylene and mineral oil, dioctylphthalate or mineral spirits;
   (b) polyethylene and mineral oil or mineral spirits;
   (c) polypropylene-polyethylene copolymer and mineral oil;
   (d) nylon and triethylene glycol; and
   (e) polyvinylidene fluoride and dibutyl phthalate.

29. A microporous material as defined in claim 26 wherein said nucleating agent is dibenzylidine sorbitol.

30. A sheet material, comprising:
a microporous structure extending to one major surface characterized by a multiplicity of spaced, randomly disposed, non-uniform shaped, equiaxed particles of thermoplastic polymer, adjacent particles throughout said microporous structure being separated from one another to provide said microporous structure with a network of interconnected micropores and being connected to each other by a plurality of fibrils consisting of said thermoplastic polymer, said particles containing enough of a nucleating agent such that the size of said particles is significantly reduced over the size said particles would have if no nucleating agent were present; and
an opposite major surface comprised of said polymer but not having said microporous structure.

31. A sheet material as defined in claim 30 wherein said nucleating agent comprises from about 0.1 to about 5 parts by weight per 100 parts of polymer.

32. A microporous material as defined in claim 26 wherein the average size of said particles is about 2 microns or less.

33. A microporous material as defined in claim 26 wherein said nucleating agent is selected from the group consisting of aryl alkanoic acid compounds, benzoic acid compounds, and dicarboxylic acid compounds.

34. A microporous material as defined in claim 26 wherein said nucleating agent is selected from the group consisting of titanium dioxide, talc, adipic acid, benzoic acid, and fine metal particles.

35. A microporous material as defined in claim 26 wherein said thermoplastic polymer is polypropylene.

* * * * *